United States Patent [19]
Pocha et al.

[11] Patent Number: 5,120,007
[45] Date of Patent: Jun. 9, 1992

[54] GEOSTATIONARY SATELLITE SYSTEM

[75] Inventors: Jehangir J. Pocha; A. C. Studd, both of Stevenage, England

[73] Assignee: British Aerospace Public Limited Company, London, England

[21] Appl. No.: 459,275

[22] Filed: Dec. 29, 1989

[30] Foreign Application Priority Data

Mar. 11, 1989 [GB] United Kingdom ............... 8905610

[51] Int. Cl.⁵ ............................................... B64G 1/10
[52] U.S. Cl. ............................................... 244/158 R
[58] Field of Search ................................... 244/158 R

[56] References Cited

U.S. PATENT DOCUMENTS

| | | | |
|---|---|---|---|
| 3,995,801 | 12/1976 | Bond | 244/158 |
| 4,502,051 | 2/1985 | Donde | 244/158 R |
| 4,691,882 | 9/1987 | Young | 244/158 R |

FOREIGN PATENT DOCUMENTS

2134353 8/1984 United Kingdom .

*Primary Examiner*—Joseph F. Peters, Jr.
*Assistant Examiner*—Carla Mattix
*Attorney, Agent, or Firm*—Cushman, Darby & Cushman

[57] ABSTRACT

A geostationary satellite system includes an operational satellite and a spare or back-up satellite, characterized in that the spare or back-up satellite is located in a geostationary orbit (3) at the same mean longitude as the operational satellite, with the inclination and eccentricity of the spare or back-up satellite orbit (3) being non-zero, and with the apse line (4) of the spare or back-up satellite orbit (3) being close to, or coincident with, the node line, so that the spare or back-up satellite can be co-located with the operational satellite with minimal risk or collision or communications interference therewith.

9 Claims, 1 Drawing Sheet 12,120,007

GEOSTATIONARY SATELLITE SYSTEM

FIELD OF THE INVENTION

This invention relates to a geostationary satellite system and particularly, but not exclusively, concerns such a system suitable for providing one or more communications satellites in orbit in space around Earth.

BACKGROUND OF THE INVENTION

A satellite communication system requires one or more spare or back-up satellites in orbit in order to provide a high reliability service with a minimum of down time. Conventionally one such spare or back-up satellite is located close to the operational satellite but at a different longitude. This has the advantage of preventing collision between the operational and spare satellites but if the spare or back-up satellite is required to take over service from the operational satellite several days can elapse before the spare satellite can be brought into station and made operational.

OBJECTS OF THE INVENTION

Thus one object of the present invention is to provide a generally improved geostationary satellite system in which a spare or back-up satellite can effectively be co-located with an operational satellite with minimal risk of collision or communications interference therewith.

This and other objects and advantages of the present invention will become more apparent from details disclosed in the following specification where preferred embodiments of the invention are enclosed.

SUMMARY OF THE INVENTION

According to the present invention there is provided a geostationary satellite system including an operational satellite and a spare or back-up satellite, in which the spare or back-up satellite is located in a geostationary orbit in space at the same mean longitude as the operational satellite, with the inclination and eccentricity of the spare or back-up satellite orbit being non-zero, and with the apse line of the spare or back-up satellite orbit being close to, or coincident with, the node line, so that the spare or back-up satellite can be co-located with the operational satellite with minimal risk of collision or communications interference therewith.

Advantageously orbit inclination of the spare or back-up satellite is in the range of from 3°-5°, with the orbit pole being so located as to cause, in operation, the inclination to reduce, pass through a minimum but non-zero value, and then increase.

Preferably the orbit eccentricity of the spare or back-up satellite is substantially 0.001.

DESCRIPTION OF THE DRAWINGS

For a better understanding of the present invention and to show how the same may be carried into effect, reference will now be made, by way of example, to the accompanying single figure drawing in which.

DESCRIPTION OF EMBODIMENTS OF THE INVENTION

Figure 1:
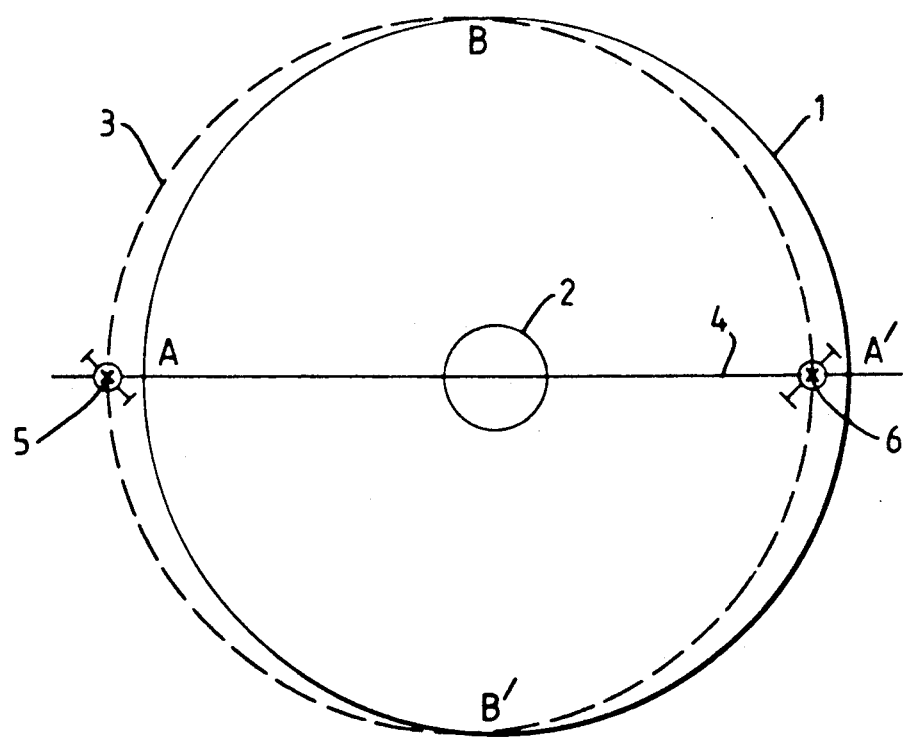
FIG. 1 shows diagrammatically the orbits of an operational satellite and a spare or back-up satellite of a satellite system according to a first embodiment of the invention, in operation around the Earth.

A geostationary satellite system according to the invention as illustrated generally in FIG. 1 of the accompanying drawings includes an operational satellite whose circular geostationary orbit is indicated in solid line at 1 and at least one spare or back-up satellite whose elliptic geostationary orbit around the Earth 2 is indicated by the dotted line 3. To allow the spare satellite to be located in the same orbital slot as the operational satellite with minimum danger of collision and to avoid constraining the deadband of the operational satellite it is necessary to provide a specific orbit for the spare satellite. The spare satellite is located in a geostationary orbit at the same mean longitude as the operational satellite with the inclination and eccentricity of the spare or back-up satellite orbit being non-zero. Preferably the orbit inclination of the spare satellite is in the range from 3°-5° with the orbit pole being so located as to cause, in operation, the inclination at first to reduce, then to pass through a minimum but non-zero value and finally increase.

The line of apsides 4 of the spare satellite orbit 3 must be close to, or coincident with, the node line as illustrated in FIG. 1 in which the line of apsides 4 is coincident with the node line passing through the Earth 2 and orbit Apogee 5 and Perigee of the orbit 3.

The eccentricity of the spare satellite orbit 3 preferably is substantially 0.001.

Collision between the spare and operational satellite is avoided in that away from the nodes, that is for most of the orbit duration, the two satellites are well separated by virtue of the spare satellites inclination. Close to the node line the two satellites are separated by virtue of the eccentricity of the spare satellite orbit 3 which means that the spare satellite would be either substantially higher than or lower than the operational satellite.

As shown in FIG. 1 in regions A,A[1] the spare and operational satellites are both in the equitorial plane but at different radii from the Earth. In regions B,B[1] the two satellites are at the same radii from the Earth, but separated in latitude.

The geostationary satellite system of the present invention has the advantages of enabling rapid replacement of a failed operational satellite, avoidance of frequency-co-ordination problems for the testing of a spare satellite in a geostationary orbit and the ability to use a single control station for spare and operational satellites. Additionally such a system results in minimum use of fuel for the spare satellite owing to free drift in latitude and avoidance of constraint in the longitude deadband of the operational satellite.

Various modifications and alterations may be made to the embodiments of the present invention described and illustrated, within the scope of the present invention as defined in the following claims.

What is claimed is:

1. A method of operation of a geostationary satellite system, comprising the steps of:
   providing an operational satellite and a spare or back-up satellite; and
   locating both said satellites in a geostationary orbit, in which the spare or back-up satellite is located in a geostationary orbit in space at a same mean longitude as the operational satellite, and
   maintaining inclination and eccentricity of the spare or back-up satellite orbit as non-zero, and with an apse line of the spare or back-up satellite orbit being close to, or coincident with, a node line, so that the spare or back-up satellite can be co-located with the operational satellite with minimal risk of collision or communications interference therewith.

2. A method as in claim 1, in which the orbit inclination of the spare or back-up satellite is in the range from 3°-5°, and comprising the step of locating an orbit pole as to cause, in operation, the inclination to reduce, pass through a minimum but non-zero value and then increase.

3. A method as in claim 2, in which the orbit eccentricity of the spare or back-up satellite is substantially 0.001.

4. A method of establishing a two-satellite system in geostationary orbit, comprising the steps of:
   locating a first satellite into a first geostationary orbit;
   locating a second satellite into a second geostationary orbit at a same mean longitude as the first satellite; and
   maintaining inclination and eccentricity of the second satellite orbit as non-zero, and with an apse line of the second satellite orbit being close to, or coincident with, a node line thereof, so that the satellites can be co-located to avoid risk of collision or communications interference therebetween.

5. A method according to claim 4, in which the orbit inclination of the second satellite is in the range of from 3°-5°, an orbit pole being so located as to cause, in operation, the inclination to reduce, pass through a minimum but non-zero value and then increase.

6. A method according to claim 5, in which the orbit eccentricity of the second satellite is substantially 0.001.

7. A method of backing-up an operational satellite in geostationary orbit, comprising the steps of:
   locating the operational satellite into a first geostationary orbit,
   locating a spare or back-up satellite into a second geostationary orbit in space at a same mean longitude as the operational satellite;
   maintaining inclination and eccentricity of the spare or back-up satellite orbit as non-zero, and with the apse line of the spare or back-up satellite orbit being close to, or coincident with, the node line, so that the spare or back-up satellite can be co-located with the operational satellite to avoid risk of collision or communications interference therewith; and
   using the spare or back-up satellite as a spare for the operational satellite.

8. A method according to claim 7, in which the orbit inclination of the spare or back-up satellite is in the range of from 3°-5°, an orbit pole being so located as to cause, in operation, the inclination to reduce, pass through a minimum but non-zero value and then increase.

9. A method according to claim 8, in which the orbit eccentricity of the spare or back-up satellite is substantially 0.001.

* * * * *